July 21, 1964 V. B. DEAN 3,141,346

MEANS FOR JOINING FLEXIBLE BELTS

Filed Sept. 27, 1961

INVENTOR.
VAL B. DEAN

BY

McGrew & Edwards
Attorneys

United States Patent Office 3,141,346

Patented July 21, 1964

3,141,346
MEANS FOR JOINING FLEXIBLE BELTS

Val B. Dean, Englewood, Colo., assignor to The Union Supply Company, Denver, Colo., a corporation of Colorado Filed Sept. 27, 1961, Ser. No. 141,102
8 Claims. (Cl. 74—231)

This invention relates to a device for joining flexible belts, and more particularly to arrangements for joining abutting ends of flexible conveyor belts to provide a smooth and substantially contiguous non-load carrying surface therefor.

In my copending application, "Means for Joining Flexible Belts," Serial No. 55,485, filed September 12, 1960, now Patent No. 3,093,005, there is disclosed arrangements for joing abutting ends of flexible conveyor belts to present a substantially contiguous loading carrying surface; and arrangements of this invention are particularly adapted for use therewith. Features described but not claimed herein are claimed in said copending application.

As noted in said application, it is common practice to provide metal staples, clips and the like to join abutting end portions of flexible conveyor belts. Such flexible conveyor belts usually include a plurality of plies of vulcanized fabric and at least an upper layer of rubber-like material. However, as was noted in said application, metal cleats and the like have not proven entirely satisfactory, particularly with increased thicknesses of conveyor belts because of the tendency of the material being conveyed to collect in countersink depressions of the fastenings. Also, when transporting hard rock ores, and particularly adjacent loading chutes and the like, there is a tendency for the ore to roll and tumble and remain at a given position relative to the loading chute while the belt continues to move. In this action detrimental abrasion and extensive wearing away of the metal fastening devices occurs. The invention of said copending application has overcome the foregoing difficulties to a large extent.

It also has been a common practice in joining abutting end portions of flexible conveyor belts to use metal clips and staples in combination with a pair of bolts or the like inserted on the bottom, or non-conveying surface, of a conveyor belt and to attach the bolts to the clips on the conveying surface. I have observed that with the increased life for the conveying surface connection utilizing the invention of said application the metal cleat on the non-conveying surface has increased incident of failure. When the connecting clips on the non-conveying surface pass around driving sheaves and pulleys supporting the conveyor belt, there is undesirable wear due to slippage between the belt and the sheaves and pulleys. Furthermore, since the connecting clips on the non-conveying surface normally are not countersunk, the leading edge thereof, in the direction of conveyor belt travel, wears away rather rapidly and eventually the bolts passing through the cleats are freed with resulting separation of lower portions of abutting edges of the conveyor belts. Countersinking overcomes this to some extent but there is still slippage on sheaves and undesirable wearing down of the leading edges of the countersink hole and the metal clip seated therein.

Accordingly, it is an object of this invention to provide improved means for joining abutting edges of the non-load carrying surfaces of flexible belts.

It is another object of the invention to provide simple, durable and efficient means for joining the non-load carrying surfaces of abutting ends of flexible conveyor belts to provide a smooth and substantially contiguous surface which does not slip or catch when passing around driving sheaves or supporting pulleys.

Another object of the invention is to provide a unitary bottom cleat assembly for joining abutting ends of flexible conveyor belts adapted for interconnection with upper load carrying surface joining devices and providing for relative movement between parts thereof when passing around sheaves or over supporting pulleys without detrimental effect to the assembly or the belt joint. A still further object of the invention is to provide a simple and easily installed bottom cleat assembly for joining abutting ends of flexible conveyor belts.

In the practice of my invention, I provide a unitary bottom cleat assembly including a rigid base portion and a pair of spaced bolts, the base and bolts being held as a unitary assembly by a single resilient cap member. The cap member is preferably fabricated of rubber or rubber-like material and has depending peripheral edge portions which overlie peripheral edges of the base. There is also included a pair of spaced, specially shaped spacers on the inner or bottom surface of the cap which seat between the bolt heads and complementary recessed surfaces of the base whereby limited relative movement between the bolt heads and rigid base is provided without causing detrimental wear to either. A plurality of spaced teeth depend from the base and are adapted to penetrate and grip intermediate plies of a conveyor belt when the clip or cleat assembly is countersunk and fastened in place on the bottom surface of such a conveyor belt.

The practice of this invention will be described with reference to the accompanying drawings in which like reference numerals are used to designate like parts in the several views. In these drawings.

Figure 1:
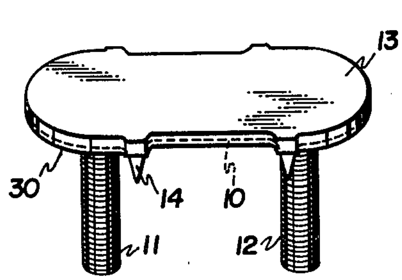
FIG. 1 is a top perspective view of a unitary bottom cleat assembly embodying the concepts of this invention.

As shown in FIG. 1, a unitary bottom cleat assembly according to this invention includes a rigid base 10 and a pair of spaced headed bolts 11 and 12 held together by a single resilient cap member 13. A plurality of teeth 14 extend from the rigid base 10 and are adapted to penetrate and grip intermediate plies of a conveyor belt when the cleat assembly is countersunk in position in a conveyor belt to be joined. Bolts 11 and 12 are mounted in spaced apertures formed in opposite end portions of the base 10. Each of these apertures has adjoining thereto two segmental adjoining bolt-supporting portions 20 and 21 formed to either side of the inwardly extending projections 22 and 23.

Figure 2:
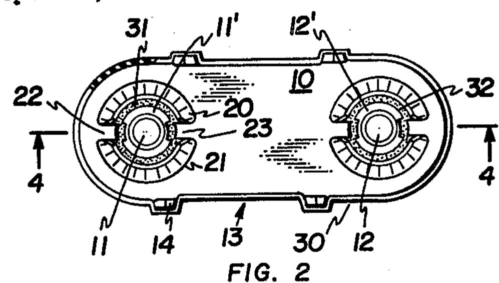
FIG. 2 is a bottom plan view of the cleat assembly of FIG. 1.
Figure 3:
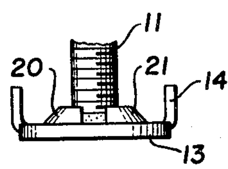
FIG. 3 is a fragmentary end view of the cleat assembly of FIG. 1.

As viewed in FIG. 2, the portions 20 and 21 are raised relative to the bottom surface of the base 10 and projections 22 and 23 remain in the same plane as the base. The bolt heads 11' and 12' are of a generally truncated conical configuration, have recesses 25 and 26 formed in opposite side portions thereof, and are adapted for complementary seating on the inner surfaces of the segmental portions 20 and 21 of the base with the projections 22 and 23 fitted in the respective apertures 25 and 26 in the head. There is enough clearance for slight movement of the heads when in place because of a loose fit between apertures 25 and 26 and the projections 22 and 23.

The resilient cap 13 is adapted to hold the bolts in place relative to the base 10. The cap, as noted above, is preferably fabricated of rubber or rubber-like material and has depending peripheral edge portions 30 which overlie the peripheral edges of base 10. As shown in FIG. 2, a pair of annular spacers 31 and 32 are formed on the inner surface of cap 13 as an integral assembly and are adapted to seat between the complementary sloping surfaces of the heads 11' and 12' of the bolts and the inner surfaces of the segmental portions 20 and 21 of base 10. Because of the character of the resilient material from which spacers 31 and 32 are fabricated, there is some relative movement allowed between adjacent rigid parts without appreciable friction contact which would cause excessive wear.

Figure 4:
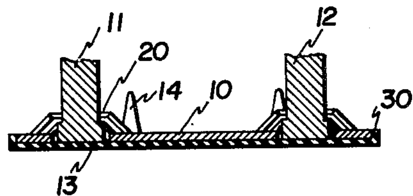
FIG. 4 is a fragmentary sectional view taken along the line 4–4 of the cleat assambly of FIG. 2.

In a like manner the depending peripheral edge portion 30 of cap 13 prevents direct contact between the rigid base 10 and adjacent portions of a conveyor belt when it is assembled in position. This prevents the base from cutting into adjacent portions of the belt when in use. In the embodiment shown in FIG. 4, the thickness of the main body of cap 13 is substantially the same as that of the base portion.

The resilient character of the material from which the cap is fabricated allows limited relative movement of the elongated threaded portions of the bolts, causing commensurate movement of the heads thereof. This is particularly advantageous when a conveyor belt having such bottom cleats passes around a sheave, as the extending portions of the bolts compensate for lengthening of the upper or load carrying surface of the conveyor belt relative to the inner surface as it passes around a sheave.

Preferably cap 13 is vulcanized in place on the rigid base with the spacers 31 and 32 in place between the complementary sloping surfaces of the bolt heads and semicircular portions 20 and 21 of base 10. Various adhesives may be used to secure the cap in place, although vulcanizing is the preferred manner of joining the parts.

Figure 4A:
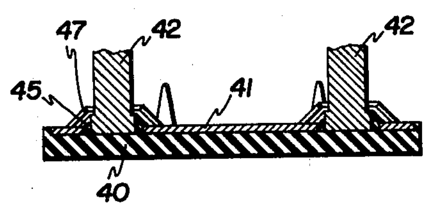
FIG. 4A is a fragmentary sectional view of an alternative cleat assembly.
Figure 5:
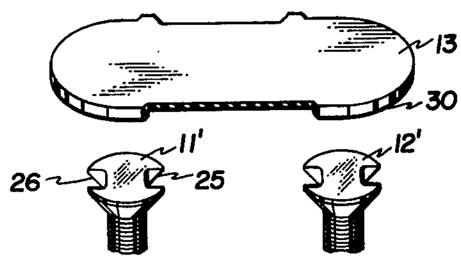
FIG. 5 is an exploded top perspective view of the elements making up the unitary cleat assembly of FIGS. 1–4.
Figure 6:
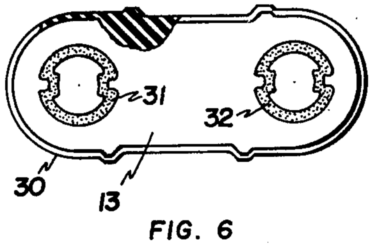
FIG. 6 is a bottom view of the resilient pad of the arrangement of FIG. 5.

One problem previously encountered in joining flexible conveyor belts with metal clips was the variation in thickness of the lower rubber ply of available conveyor belts thus requiring varying countersink depths in various belts. The unitary assembly of my invention permits varying the thickness of the body of cap 13 so as to compensate for any desired depth of countersink. FIG. 4A illustrates a relatively thick cap 40 in place on a rigid base portion 41 similar in all respects to the base 10 of FIG. 4 and showing a pair of bolts 42 and 43 extending therethrough with a spacer 45 extending from the inner or bottom surface of cap 40 between the complementary surfaces of the bolt head and a segmental portion 47 of the base whereby limited movement is allowed between these parts in a manner similar to that above discussed with reference to the arrangement of FIG. 4.

Thus, this invention provides a unitary bottom cleat assembly having a rigid base portion and a resilient rubber or rubber-like cap portion, the upper surface of which is adapted to lie in contiguous relation with adjacent portions of abutting ends of a conveyor belt when in place. With such an arrangement slippage is substantially eliminated as a conveyor belt passes around a driving sheave or supporting pulley. Furthermore, because of the novel construction of the resilient cap including its depending peripheral edge portions adapted to overlie the peripheral edges of the rigid base, and complementary internal spacers adapted to seat between bolt heads and adjacent surfaces of the rigid base, even when passing around conveyor belts, limited relative movement between the bolts and base is provided without deterioration of the assembly or undesirable wear of adjacent portions of the conveyor belt.

Figure 7:
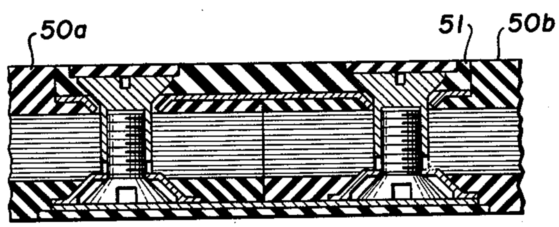
FIG. 7 is a vertical section illustrating a cleat assembly of the type shown in FIG. 1 in joining relation to abutting ends of a conveyor belt.

FIG. 7 illustrates a cleat of the type shown in FIG. 1 in a typical arrangement for joining the ends of a conveyor belt in abutting relation. As shown, abutting ends 50*a* and 50*b* of a conveyor belt have adjoining recesses in their top surfaces in which a cleat member 51 is fitted. The undersurface of the ends 50*a* and 50*b* have similar recesses disposed in a common plane with the upper recesses and a cleat assembly including a base 10 and headed bolts 11 and 12 are disposed in the lower recess and covered by the rubber cover or cap 13. The shank portions of bolts 11 and 12 are held by fastening means in the upper cleat 51, preferably by threaded connection as shown, and support means such as segmental members 20 and 21 interiorly of cover or cap 13 permit limited flexing of the shanks on the lower cleat when the belt is passing over a sheave. Preferably the undersurface of ends 50*a* and 50*b* lies in the same plane as the exposed surface of cover 13.

I claim:

1. As an article of manufacture, a unitary cleat assembly adapted for use with a top cleat device in joining abutting end portions of flexible conveyor belts, comprising a rigid base having a pair of apertures formed therethrough substantially along the lengthwise axis thereof, a pair of headed bolts fitted in said apertures and extending outwardly therefrom, means adjoining said apertures cooperating with complementary surfaces of said bolt heads in supporting said bolts, and a resilient cap secured to said base on the surface thereof opposite said support means and covering the heads of said bolts, said cap including depending peripheral edge portions overlying the peripheral edges of said base.

2. As an article of manufacture, a unitary bottom cleat assembly adapted for use with a top cleat device in joining abutting end portions of flexible conveyor belts, comprising a relatively thin rigid base, a pair of headed bolts carried thereby, and a resilient cap secured to the outer surface of said base in covering relation to the bolt heads and having flexible portions interfitted with the shank of each bolt adjoining its head so as to reduce frictional contact therebetween.

3. The assembly of claim 2 in which the cap is secured to said base by vulcanizing.

4. The assembly of claim 2 in which the cap is fabricated of a resilient rubber-like material and is substantially thicker than the said base.

5. As an article of manufacture, a unitary cleat assembly adapted for use with a top cleat device in joining abutting end portions of flexible conveyor belts, comprising a rigid base having a pair of apertures formed therethrough substantially along the lengthwise axis thereof, a pair of headed bolts fitted in said apertures and extending outwardly therefrom, means adjoining said apertures cooperating with complementary surfaces of said bolt heads in supporting said bolts, and a resilient cap secured to said base on the surface thereof opposite said means and covering the heads of said bolts, said cap including portions on its inner surface fitted between said complementary surfaces.

6. As an article of manufacture, a unitary cleat assembly adapted for use with a top cleat device in joining abutting end portions of flexible conveyor belts, comprising a rigid base having a pair of apertures formed therethrough substantially along the lengthwise axis thereof, a pair of headed bolts fitted in said apertures and extending outwardly therefrom, means adjoining said apertures cooperating with complementary surfaces of said bolt heads in supporting said bolts, a resilient cap secured to said base on the surface thereof opposite said means and covering the heads of said bolts, said cap including depending peripheral edge portions overlying the peripheral edges of said base, and a pair of spaced surfaces on the inner side of the cap resting between the complementary surfaces of the bolt heads and said supporting means.

7. The combination with a cleat fitted in adjoining recesses in the top surface of abutting ends of a conveyor belt, of another cleat fitted in similar recesses in a common plane on the underside of said ends, a pair of bolts having their heads covered by a rubber cover on the lower cleat and having shank portions fastened to means in the upper cleat, and support means for said shank portions interiorly of the rubber cover permitting limited flexing movement of the shanks on said lower cleat when the belt is passing over a sheave.

8. The combination as defined in claim 7, in which the exposed surface of the rubber cover lies in the plane of the undersurface of the belt.

References Cited in the file of this patent

UNITED STATES PATENTS

| | | |
|---|---|---|
| 1,827,327 | Noble | Oct. 13, 1931 |
| 2,814,846 | Adams et al. | Dec. 3, 1957 |
| 3,008,207 | Palow | Nov. 14, 1961 |

FOREIGN PATENTS

| | | |
|---|---|---|
| 684,396 | Great Britain | Dec. 17, 1952 |
| 874,643 | Great Britain | Aug. 10, 1961 |